(12) United States Patent
Miller et al.

(10) Patent No.: US 10,669,697 B2
(45) Date of Patent: Jun. 2, 2020

(54) PERFORMANCE MONITOR FOR A MACHINE

(71) Applicant: Caterpillar Inc., Deerfield, IL (US)

(72) Inventors: Katherine Miller, Chillicothe, IL (US); Joseph Faivre, Edelstein, IL (US); Bradley Krone, Dunlap, IL (US); Tony Metzger, Congerville, IL (US); Steve Ott, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 136 days.

(21) Appl. No.: 15/943,073

(22) Filed: Apr. 2, 2018

(65) Prior Publication Data
US 2019/0301143 A1  Oct. 3, 2019

(51) Int. Cl.
E02F 9/26 (2006.01)
E02F 9/02 (2006.01)
B60K 35/00 (2006.01)
G07C 5/02 (2006.01)

(52) U.S. Cl.
CPC ............... *E02F 9/26* (2013.01); *B60K 35/00* (2013.01); *G07C 5/02* (2013.01); *B60K 2370/174* (2019.05); *E02F 9/02* (2013.01)

(58) Field of Classification Search
None
See application file for complete search history.

(56) References Cited

U.S. PATENT DOCUMENTS

| | | | |
|---|---|---|---|
| 8,914,215 B2 | 12/2014 | Faivre et al. | |
| 9,043,113 B2 | 5/2015 | Padilla et al. | |
| 9,605,415 B2 | 3/2017 | Edara et al. | |
| 2013/0325266 A1* | 12/2013 | Padilla | E02F 3/842 701/50 |
| 2014/0156162 A1* | 6/2014 | Faivre | B60W 50/0098 701/84 |
| 2016/0202870 A1 | 7/2016 | Kubota | |
| 2017/0101103 A1* | 4/2017 | Foster | A01B 63/002 |
| 2018/0084722 A1* | 3/2018 | Wieckhorst | A01D 41/1274 |

* cited by examiner

*Primary Examiner* — Navid Ziaeianmehdizadeh
*Assistant Examiner* — Sean P Quinn
(74) *Attorney, Agent, or Firm* — Bookoff McAndrews

(57) ABSTRACT

A machine having a ground-engaging work tool is disclosed includes a traction device configured to move the machine on a ground surface, a control system configured to determine a slip experienced by the machine as the machine moves on the ground surface, and a display device. The display device may be configured to pictorially display (a) the determined slip, and (b) one or more target ranges of slip, wherein the machine efficiency when slip has a value within a target range may be higher compared to the efficiency when slip is outside the target range.

20 Claims, 4 Drawing Sheets

PERFORMANCE MONITOR FOR A MACHINE

TECHNICAL FIELD

The present disclosure relates generally to a performance monitor for a machine, and more particularly, to a performance monitor for a mobile excavation machine.

BACKGROUND

Mobile excavation machines such as dozers, agricultural tractors, and scrapers often include one or more material engaging implements utilized to interact with (e.g., cultivate, dig, rip or otherwise disturb) a ground surface. As the machines traverse the worksite, the magnitude of resistance applied by the ground material on the implements and traction devices of the machines vary. When the resistance increases beyond a threshold value, the traction devices (e.g., tracks, tires, etc.) of the machine slips on the ground surface. Track (or tire) slip occurs when the tracks are turning faster than the ground speed of the machine. As a result of track slip, less than all the power developed by the machine is used to move material. Reducing the load moved by the machine may reduce, or even eliminate, slip. However, under-loading the machine may cause a loss in productivity and efficiency of the machine. Over-loading the machine may cause excessive track slip and may possibly damage the machine. To help ensure that high productivity and efficiency of the machine are attained without damaging the machine, the operator of the machine must continuously alter settings of the machine and implement to accommodate the changing terrain and ground surface conditions. This continuous altering can be tiring for even a skilled operator and difficult, if not impossible, for a novice operator to achieve optimally.

U.S. Pat. No. 9,043,113, issued to Padilla et al. on May 26, 2015 ("the '113 patent"), describes a mobile excavation machine that includes a performance monitor to assist an operator to operate the machine in an optimized manner. The performance monitor of the '113 patent, includes a display of the current torque output of the machine overlaid on an optimal torque output range. Based on this display, the operator can control the machine to optimize the torque output. While the performance bar of the '113 patent may be useful in some applications, it may not provide sufficient information for other machine applications. The performance monitor of the present disclosure may solve one or more of the problems set forth above and/or other problems in the art. The scope of the current disclosure, however, is defined by the attached claims, and not by the ability to solve any specific problem.

SUMMARY

In one aspect, a machine having a ground-engaging work tool is disclosed. The machine may include one or more traction devices configured to move the machine on a ground surface, and a control system configured to determine a slip experienced by the machine as the machine moves on the ground surface. The slip may be determined based on a difference between a machine speed and a ground speed of the machine, wherein the machine speed is an expected speed of the machine based on a speed of at least one traction device of the one or more traction devices and the ground speed is a speed at which the machine is moving on the ground surface. The machine may also include a display device configured to pictorially display (a) the determined slip, and (b) one or more target ranges of slip. The efficiency of the machine when the determined slip has a value within a target range of the one or more target ranges may be higher compared to the efficiency when the value of the determined slip is outside the target range.

In another aspect, a method of operating a machine having a ground-engaging work tool and one or more traction devices configured to move the machine on a ground surface is disclosed. The method may include determining, using a control system, a slip experienced by the machine as the machine moves on the ground surface. The slip may be determined based on a difference between a machine speed and a ground speed of the machine. The machine speed may be an expected speed of the machine based on a speed of at least one traction device of the one or more traction devices, and the ground speed may be a speed at which the machine is moving on the ground surface. The method may also include displaying pictorially, on a display device of the machine, (a) the determined slip, and (b) one or more target ranges of slip. An efficiency of the machine when the determined slip has a value within a target range of the one or more target ranges may be higher compared to the efficiency when the value of the determined slip is outside the target range.

In yet another aspect, a machine having a ground-engaging work tool is disclosed. The machine may include one or more traction devices configured to move the machine on a ground surface, a first sensor configured to detect a signal indicative of a speed of a traction device of the one or more traction devices, and a second sensor configured to detect a signal indicative of a speed of the machine on the ground surface. The machine may also in include a control system in communication with the first and second sensors. The control system may be configured to determine a slip experienced by the traction device as the machine moves on the ground surface based on the signals from the first and second sensors, and a display device in communication with the control system. The display device may be configured to simultaneously display (a) the determined slip, (b) a first target range of slip, and (c) a second target range of slip different from the first target range. Wherein, during a first stage of operation of the machine, when the determined slip has a value within the first target range, an efficiency of the machine may be higher compared to the efficiency when the value of the determined slip is outside the first target range. And, during a second stage of operation of the machine different from the first stage, when the determined slip has a value within the second target range, the efficiency of the machine may be higher compared to the efficiency when the value of the determined slip is outside the second target range.

DETAILED DESCRIPTION

In this disclosure, relative terms, such as, for example, "about" is used to indicate a possible variation of ±10% in a stated numeric value. Although the current disclosure is described with reference to a specific machine, this is only exemplary. In general, the current disclosure can be applied to any suitable machine.

Figure 1:
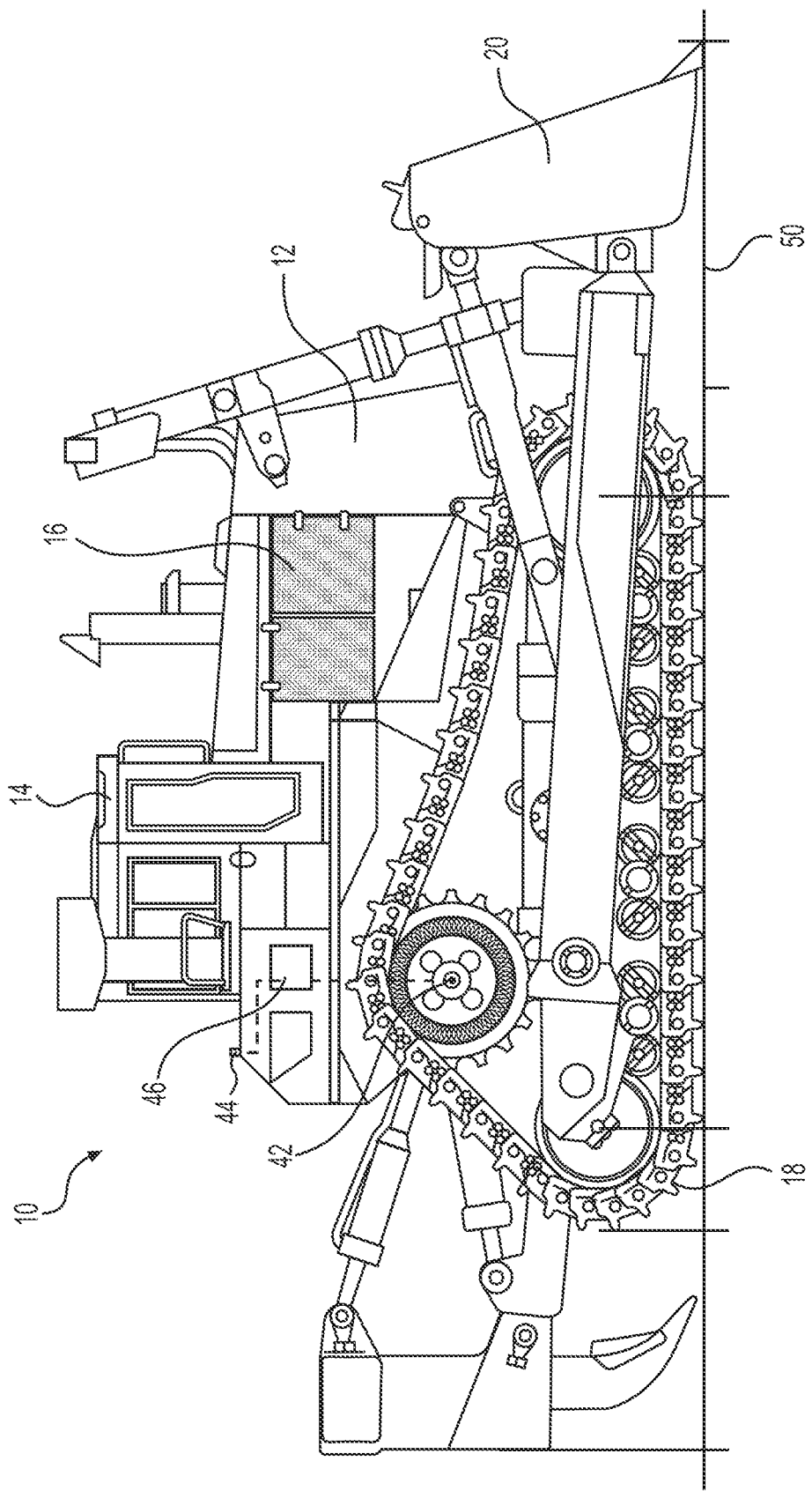
FIG. 1 is an illustration of a mobile excavation machine in one embodiment.

FIG. 1 illustrates an exemplary machine 10 operating on a ground surface 50 at a worksite. Machine 10 may be a mobile machine that performs some type of operation associated with an industry such as mining, construction, farming, transportation, or any other industry known in the art. Exemplary operations include, among others, dozing, ripping, scraping, digging, etc. Accordingly, machine 10 may be an earth moving machine such as a dozer (shown in FIG. 1), a scraper, an agricultural tractor, a wheel loader, or another machine known in the art. Machine 10 may generally include a frame 12 that supports an operator station 14, one or more engines 16, a plurality of traction devices 18 (only one visible), and at least one work tool 20. Traction devices 18 and work tool 20 may be operatively connected to frame 12 and powered by engine 16.

Engine 16 may be an internal combustion engine (diesel engine, a gasoline engine, a gaseous fuel-powered engine, etc.) or a non-combustion power source (e.g., fuel cell, battery, or another source known in the art) that produces a mechanical power output. The power output from engine 16 may be received by a torque converter (not shown) and passed through a transmission (not shown) to drive traction devices 18 and operate work tool 20. In some embodiments, traction devices 18 may embody tracks located at opposing sides of machine 10. Each track may be independently driven to turn machine 10 or simultaneously driven to propel machine 10 on ground surface 50. In some embodiments, one or all of traction devices 18 may be replaced with another type of traction device, such as, for example, belts, wheels, etc. Work tool 20 may be a tool (such as, for example, a blade, a bucket, a fork arrangement, a shovel, etc.) used to perform a particular task (such as, for example, dozing, ripping, scraping, digging, leveling, etc.) on ground surface 50.

Machine 10 may include one or more sensors configured to detect different operating parameters of machine 10. These sensors may include a sensor 42 that is configured to detect a speed of traction devices 18 (i.e., the speed at which machine 10 is supposed to move based on the speed of the traction devices 18), and a sensor 44 (e.g., doppler, radar, laser, GPS type sensor, etc.) that is configured to detect an actual speed of machine 10 as it travels along ground surface 50 (i.e., the speed at which the machine is actually moving on the ground). In this discussion, the expected speed of machine 10 (e.g., based on the detected speed of the traction devices 18) is referred to as "machine speed," and the actual speed of machine 10 on ground surface 50 is referred to as "ground speed." In some embodiments, these sensors may also include a grade sensor to detect a grade of ground surface 50 (via, for example, the inclination of machine 10) and other sensors. Machine 10 may also include a controller 46 (or a control system) in communication with the sensors, engine 16, work tool 20, and other components of machine 10. Controller 46 may embody a single or multiple microprocessors, field programmable gate arrays (FPGAs), digital signal processors (DSPs), etc., that are capable of controlling the operation of machine 10 in response to the received input. It should be appreciated that controller 46 can be a separate electronic component configured to perform specific functions or may be a general machine controller capable of controlling numerous machine functions and modes of operation.

Operator station 14 may include one or more interface devices (accelerator pedal, brake pedal, steering device, joystick, etc.) (not shown) located proximate to an operator seat and configured to generate control signals associated with operation of machine 10. In some embodiments, these interface devices may direct signals to controller 46. And, controller 46 may control machine 10 at least partly based on these input signals. Some of the interface devices (accelerator pedal, etc.) may be configured to move machine 10 along ground surface 50, and some the interface devices (e.g., a joystick) may be configured to control work tool 20 in a manner desired by the operator (e.g., raising, lowering, tilting, pivoting, etc.). Operator station 14 may further include a monitor located proximate to the operator seat and positioned so at to be visible to an operator operating machine 10. The monitor may be configured to display information relating to performance of machine 10. The operator may operate machine 10 using the interface devices at least partly based the information displayed on the monitor.

Figure 2:
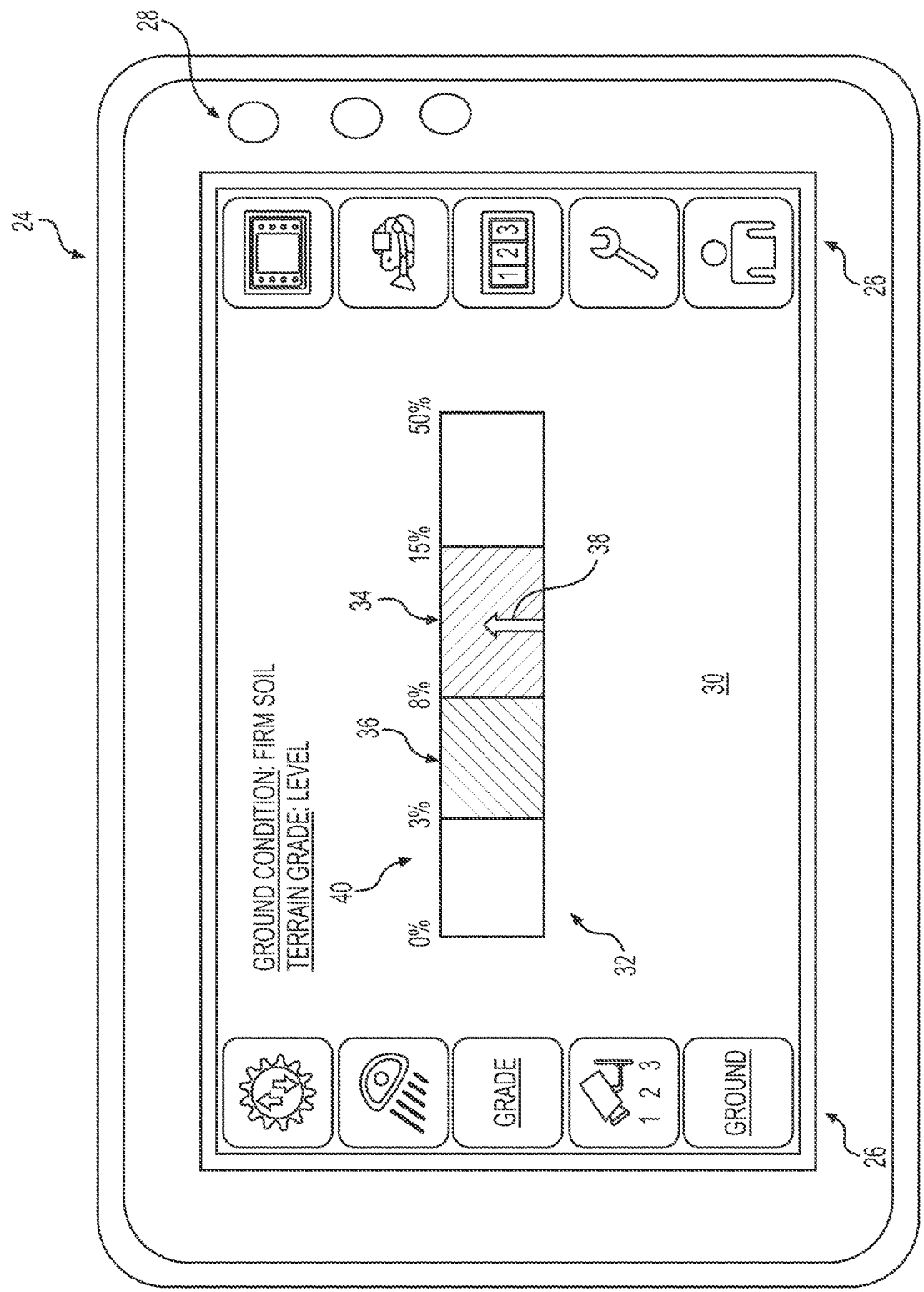
FIG. 2 is an illustration of a performance monitor of the machine of FIG. 1 in an exemplary embodiment.

FIG. 2 illustrates an exemplary monitor 24 that may be used on machine 10. Monitor 24 may be any appropriate type of device that provides a graphics user interface (GUI) for presentation of machine performance information to the operator. For example, monitor 24 may be a computer console, an LCD screen, a plasma screen, or another device that receives information from devices (control systems, sensors, etc.) and displays corresponding information for the operator. It is contemplated that, in some embodiments, monitor 24 may be configured to receive input from the operator (e.g., regarding desired modes of operation, etc.), for example, by way of a touch screen interface 26 and/or physical buttons 28 and switches. As shown in the exemplary embodiment of FIG. 2, monitor 24 may include, among other things, a screen area 30 configured to display information to the operator. Controller 46 may use screen area 30 to display any type of information (e.g., information regarding operation of machine 10) to the operator. Among other types of information, in some embodiments, the displayed information may include images from cameras (e.g., showing status of work tool 20, images of the terrain of the worksite, etc.) associated with machine 10, textual display of information related to machine 10, etc. In some embodiments, the displayed information may include information regarding the current status of work tool 20 (e.g., loaded condition of work tool 20, etc.).

Controller 46 may also display a performance bar 32 on screen area 30. In some embodiments, performance bar 32 may include a display of an overall range 40 of a performance parameter of machine 10 and one or more target ranges (e.g., first target range 34 and second target range 36) as subsets of the overall range 40. Controller 46 may also display a marker 38 that indicates the current status or performance of machine 10 in performance bar 32. Performance bar 32 may use marker 38 to indicate the current performance of machine with respect to any performance parameter (torque, load on work tool 20, slip, etc.) of machine 10. In some embodiments, the operator may be able to switch between different performance bars to view the performance of the machine with respect to different performance parameters. For example, when monitor 24 is displaying a torque based performance bar (e.g., comparing the current torque output of machine 10 with respect to one or more target torque ranges), the operator may switch the display (e.g., using a touch screen interface 26 or a button 28 of monitor 24) to a slip based performance bar. As exemplary slip based performance bar will be described below.

A slip based performance bar 32 may be used to indicate the current slip condition of machine 10. For example, in an exemplary embodiment, overall range 40 may indicate a possible range of slip of machine 10, and target ranges 34, 36 may indicate the desired ranges of slip for improved performance. And, the position of marker 38 on performance bar 32 may indicate the currently experienced slip of machine 10. With reference to FIG. 1, during operation, when work tool 20 (also called a "blade") engages with the material of ground surface 50, load on machine 10 increases. When this load increases beyond a point (and/or a tractive coefficient of ground surface 50 is reduced), traction devices 18 may begin to slip. Slip occurs when traction devices 18 of machine 10 are turning faster than the ground speed of machine 10. For the purposes of this disclosure, slip is defined as a difference between the machine speed and the ground speed of machine 10 (i.e., the difference between the speed at which machine 10 is expected to move based on the speed of traction devices 18 and the actual speed of machine 10 on ground surface 50). When the machine speed is the same as the ground speed, slip is zero. As the machine speed increases beyond the ground speed, the value of slip increases. The value of slip can be measured as a percent of the machine speed (or in some embodiments, ground speed). For example, for a given ground speed of about 2 km/hr and a machine speed of about 2.2 km/hr, the slip is about 9% (i.e., ((machine speed−ground speed)/machine speed)×100).

For efficient operation of machine, there should be some slip between traction devices 18 and ground surface 50. As a person of ordinary skill in the art would recognize, in addition to the obvious productivity benefits realized by increasing the load moved by machine 10 as it traverses the worksite, a limited amount of slip also improves the tractive efficiency of machine 10. Slip also provides cushioning (or a safety valve) against shock overloads that could damage the powertrain of machine 10. However, excessive slip can lead to increased degradation of components of machine 10 and result in lost productivity. For efficient operation of machine 10, slip should be maintained within an optimal range (e.g., a target range). Typically, this optimal range depends, among others, on the condition (e.g., soil type, hardness, etc.) of ground surface 50 and other operating conditions of machine 10.

Figure 3:
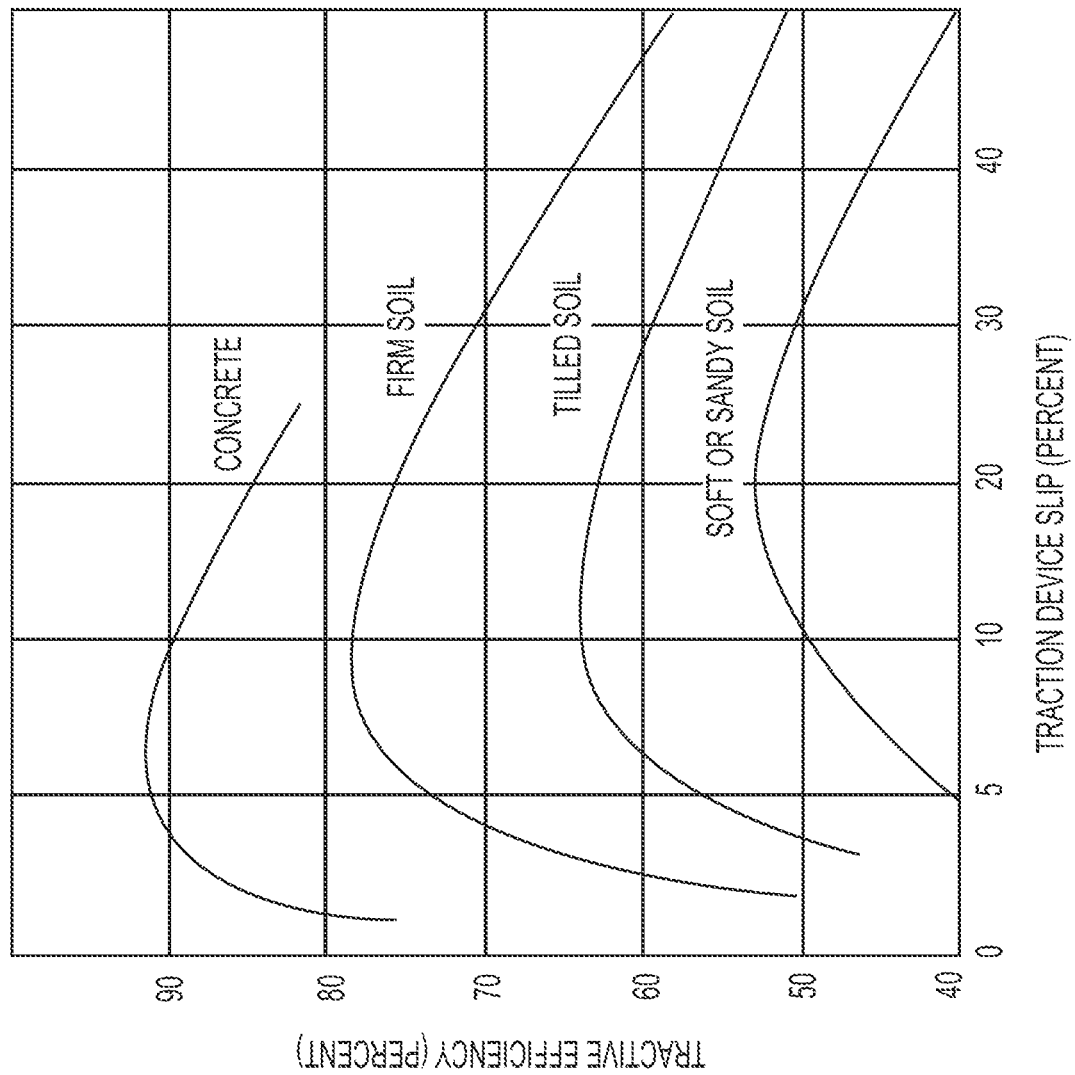
FIG. 3 is a graph showing the tractive efficiency of an excavating machine versus slip for different ground surface conditions in an exemplary embodiment.

FIG. 3 illustrates the relationship between slip and tractive efficiency for several different soil conditions in an exemplary embodiment. For efficient operation of machine 10, slip should be maintained near the peak tractive efficiency. As can be seen in FIG. 3, based on the type of ground surface 50, peak tractive efficiency can be achieved by maintaining slip within a specific range (e.g., between about 4-10% for concrete, between about 6-15% for firm soil, between about 8-15% for tilled soil, between about 15-25% for soft or sandy soil, etc.). In some embodiments, the range of slip that optimizes the tractive efficiency (or another efficiency parameter) of machine 10 may be selected as a target range (e.g., one of first target range 34 or second target range 36) of performance bar 32 of FIG. 2. It should be noted that the efficiency parameter (e.g., tractive efficiency) and the described optimal ranges of FIG. 3 are merely exemplary. In general, based upon factors such as, for example, machine type, ground surface condition, grade, soil condition (dry, wet, etc.), etc., the optimal range of slip for efficient operation of machine 10 may vary between any two values (e.g., between about 5-30%, 5-20%, 5-15%, 8-15%, 8-12%, etc.).

In some embodiments, the optimal range may also depend upon the type of operation being performed by machine 10 and/or the load on work tool 20. For example, when machine 10 is performing a leveling operation on ground surface 50 (e.g., collecting soil from a first region of ground surface 50, carrying the soil to a second region, and disbursing the soil at the second region), the optimal range of slip when work tool 20 is being loaded (e.g., with soil) may be a first range, when the load is being carried to the second region may be a second range, and in some cases, when the load is being disbursed may be a third range. In some embodiments, when work tool 20 is being loaded, the optimal range of slip may be, for example, between about 8-15%. In such embodiments, it may be advantageous to load work tool 20 such that the actual slip experienced by machine is between about 8-15%. And, as the soil is gradually disbursed from work tool 20 as machine 10 traverses ground surface 50, the load on work tool 20 progressively decreases, and consequently, the optimal range of slip for efficient operation of machine 10 may also change (e.g., decrease to between about 3-8%).

With reference to FIG. 2, in some embodiments, the optimal range of slip during loading of work tool 20 (e.g., when machine 10 is collecting material in its work tool 20) may be selected as one target range (e.g., first target range 34), and the optimal range of slip as the load being carried to another region or during unloading of work tool 20 (e.g., when machine 10 is disbursing the load) may be selected as another target range (e.g., second target range 36). In some embodiments, a total possible range of slip (e.g., between about 0-50%) that encompasses the first and second target ranges 34, 36 may be displayed as overall range 40 in performance bar 32. During operation of machine 10, based on inputs from sensors (e.g., sensors 42, 44), controller 46 may compute the slip currently experienced by machine 10 (for example, as ((track speed−ground speed)/ground speed)×100), and display this calculated value on performance bar 32 using marker 38. Controller 46 may re-compute the current value of slip experienced by machine 10 (in real-time or periodically) and update (continuously or periodically) the location of marker 38 on performance bar 32. Using this display, the operator of machine 10 may manipulate machine 10 (e.g., by raising or lowering work tool 20 relative to ground surface 50) to move marker 38 into a desired target range 34, 36, to improve a performance (e.g., productivity, efficiency, etc.) of machine 10.

Although FIG. 2 illustrates two target ranges in performance bar 32, this is only exemplary. In general, performance bar 32 may display multiple target ranges as subsets within an overall range 40. For example, performance bar 32 may display different target ranges configured for different operations of machine 10. In some exemplary embodiments, the display of overall range 40 may be eliminated, and the multiple target ranges (e.g., first and second target ranges 34, 36) may be displayed independently. Further, although first and second target ranges 34, 36 (of FIG. 2) are shown as forming a continuous range (i.e., the lower extent of first target range 34 being the same as the upper extent of second target range 36), this is only exemplary. In general, the different target ranges may be positioned relative to each other in any manner (portions may overlap, form a continuous range, spaced apart, etc.). In some embodiments, the different target ranges may not be independent of each other. However, in general, the different target ranges in performance bar 32 may be distinguished (e.g., visually) from each other. In some embodiments, the first and second target ranges 34, 36 may be spaced apart. For example, when first target range 34 is between about, for example, 7-14% and second target range 36 is between about, for example, 2-5%, the first and second target ranges 34, 36 will be spaced apart.

In some embodiments, one or both of the first and second target ranges 34, 36 may be fixed during an operational run (e.g., as machine 10 performs the leveling operation discussed above). However, in some embodiments, one or both of the first and second target ranges 34, 36 may change during operation of machine 10. For example, in the exemplary embodiment discussed above, first range 34 may change as the material load on work tool 20 decreases. This change in range may include an increase and/or decrease in the upper and lower extents of the range, the range becoming narrower, becoming wider, etc. as the load on work tool 20 decreases. In some embodiments, the multiple target ranges (e.g., first target range 34 and second target range 36) of performance bar 32 may be displayed in a manner such that they can be distinguished from each other (shown in a different color, using a different pattern, etc.).

Controller 46 may store the different target ranges of slip (e.g., first target range 34, second target range 36, etc.) associated with different ground surfaces, terrain conditions, load conditions, etc. in an associated memory, for example, as a map. Each of these maps may be in the form of tables, graphical curves, and/or equations. During operation, controller 46 may select the appropriate target ranges to display in performance bar 32 based on operator input. For example, based on input from the operator (using, for example, touch screen interfaces 26 and/or buttons 28 of monitor 24) regarding one or more of the ground condition (firm soil, soft soil, gravel, tilled soil, concrete, etc.), terrain condition (wet, dry, grade, etc.), etc., controller 46 may select the target ranges to be displayed on performance bar 32. In some embodiments, the input based upon which the target ranges are determined may also be displayed on screen area 30 of monitor 24. In some embodiments, controller 46 may determine or revise the map-obtained target ranges based on input from one or more sensors of machine 10. For example, a pitch sensor may indicate the current pitch of machine 10, and controller 46 may revise the map-obtained target ranges to account for the effect of gravity on the target ranges.

In some embodiments, previous experience with machine 10 may indicate that slip within a range improves efficiency of machine 10. For example, prior experience may indicate that, for the type and condition of ground surfaces that machine 10 typically operates on, values of slip between about, for example, 8-12% during loading and about, for example, 3-7% during unloading increases efficiency. Based on this information, 8-12% and 3-7% may be preprogrammed into controller 46 as first and second target ranges respectively. During operation, controller 46 may display these pre-programmed ranges as default values of first and second target ranges 34, 36 in performance bar 32. The operator may then modify or change these values if desired and operate the machine such that marker 38 is positioned within first target range 34 during loading and within second target range 36 during unloading.

It should be noted that the illustration of monitor 24 and performance bar 32 in FIG. 2 is only exemplary. Any type of pictorial display may be used to indicate the target ranges of slip and the actual slip experienced by machine 10 to the operator. In some embodiments, as illustrated in FIG. 2, performance bar 32 may include horizontally extending bars. However, many other types of display (e.g., vertically extending bars, a substantially circular display similar to a speedometer, etc.) are also contemplated.

INDUSTRIAL APPLICABILITY

The disclosed performance monitoring system may be applied in any mobile machine to improve efficiency. In an exemplary embodiment, the disclosed performance monitor displays the current slip experienced by the machine along with one or more target ranges of slip that improves the efficiency of the machine. And, based on this display, the operator can control the machine such that the slip experienced by the machine is within the target range. An exemplary method of using an exemplary performance monitor will now be described.

Figure 4:
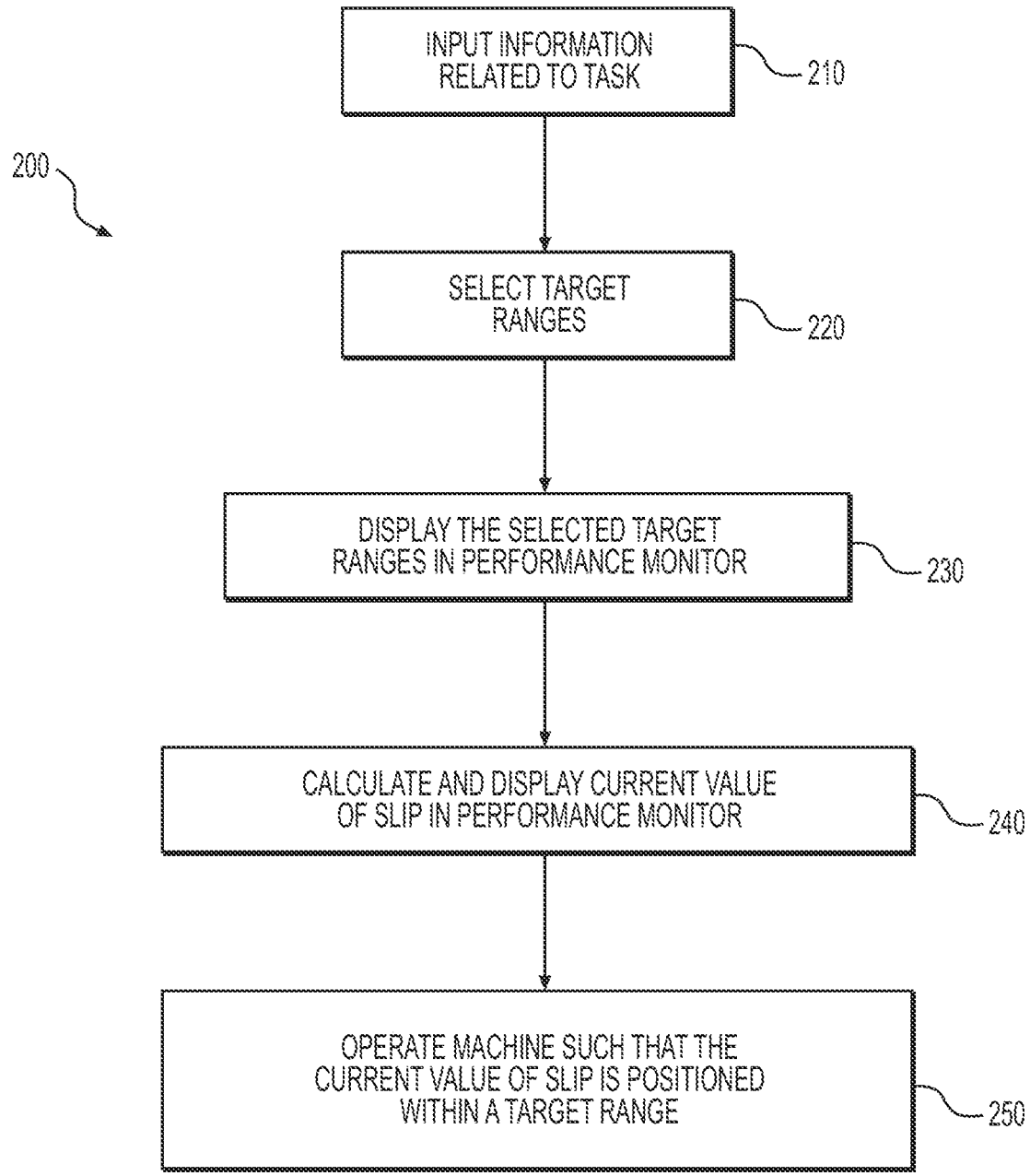
FIG. 4 is a flow chart showing an exemplary method of operating the machine of FIG. 1.

FIG. 4 is a flow chart that illustrates an exemplary method of operating a machine (e.g., machine 10 of FIG. 1) with a disclosed performance monitor (e.g., as illustrated in FIG. 2). In the description below, reference will be made to FIGS. 1, 2, and 4. During (or prior to) an exemplary operation to level a ground surface 50 using machine 10, the operator (of machine 10) may input information related to the leveling operation on monitor 24 of machine 10 (step 210). In some embodiments, the operator may input information using touch screen interface 26 and/or buttons 28 of monitor 24. The inputted information may include, among others, the condition of ground surface 50 (firm soil, tilled soil, etc.) that machine 10 will be operating on. Based at least partly on the inputted information, controller 46 of machine 10 may select one or more target ranges of slip that will improve the efficiency of machine 10 from a map stored in machine 10 (step 220). In some embodiments, the selected target ranges may include a first target range 34 that indicates the optimal range of slip values when material of ground surface 50 is being loaded on work tool 20, and a second target range 36 that indicates the optimal range of slip values when the loaded material is being discharged or disbursed on ground surface 50. Controller 46 may then display the selected target ranges in a performance bar 42 on monitor 24 (step 230). Based on sensor input, controller 46 may determine the current value of slip experienced by machine 10 and display it on performance bar 42 using marker 38 (step 240). In some embodiments, the current value of slip may be determined as current slip=(track speed−ground speed)/ground speed. In some cases (e.g., if the target range is displayed as a percentage range), the determined slip value may be expressed as a percentage (i.e., by multiplying by 100). The position of marker 38 with respect to the displayed target ranges may indicate to the operator if the slip experienced by machine 10 is within an optimal range. The operator may now control machine 10 such that the slip experienced by machine 10 (e.g., as indicated by marker 38) is within a displayed target range (step 250).

The operator may control machine 10 in any known manner to control slip (i.e., step 250). In some embodiments, when machine 10 is loading material from ground surface 50 on work tool 20, if the current slip experienced by machine 10 is lower than first target range 34 (i.e., position of marker 38 is to the left of first target range 34 in FIG. 2), the operator may lower work tool 20 to load more material on work tool 20. Increasing the load on work tool 20 increases slip as machine 10 moves along ground surface 50 collecting material. However, if the currently experienced slip by machine 10 is higher than first target range 34 (i.e., position of marker 38 is to the right of first target range 34 in FIG. 2), the operator may raise the position of work tool 20 to reduce the load on work tool 20 and thereby reduce slip. In some embodiments, the operator may control work tool 20 in a similar manner while discharging material from work tool 20 to bring the slip experienced by machine 10 within second target range 36.

It should be appreciated that the above described method is merely exemplary. In some embodiments, the method may include a number of additional or alternative steps, and in some embodiments, one or more of the described steps may be omitted. For example, in some embodiments, instead of determining the target ranges based on user input (e.g., as described with reference to steps 210 and 220), controller 46 may select default target ranges (e.g., based on prior experience) and present these default target ranges as first and second target ranges 34, 36 on performance bar 32 in step 230. In some embodiments, these default ranges may then be modified by the operator (e.g., using touch screen interface 26 and/or physical buttons 28) if desired. Prior experience may indicate that a first target range 34 of, for example, about 8-12% and a second target range 36 of, for example, 4-8% is effective for most ground surfaces 50 that machine 10 operates on. This data may be programmed into controller 46. And, in step 230, controller 46 may display these preselected ranges as first and second target ranges 34, 36. Any described step may be omitted or modified, or other steps added, as long as the intended functionality of the performance monitor remains substantially unaltered. Further, although a certain order is described or implied in the above-described method, in general, the steps of the described method need not be performed in the illustrated and described order. Further, the described method may be incorporated into a more comprehensive process having additional functionality not described herein.

Experience and customer feedback indicates that most machine operators do not know how much more material can be loaded on a work tool of an excavation machine during operation (i.e., optimal operating point of the machine with respect to slip). This causes the operators to take more passes with smaller work tool loads (or blade loads) rather than fewer passes with full blade loads. Taking more passes increases reduces productivity and efficiency and increases wear of the machine (e.g., machine undercarriage wears at a faster rate). Displaying a performance monitor with optimal ranges for slip enables the operator to operate the machine such that the slip experienced by the machine is optimized and the machine is operated at its full capacity. Operating the machine with a full blade load decreases the number of passes needed to complete a task and thereby increases productivity and reduces machine wear. Providing multiple target ranges in the performance monitor enables the operator to control the machine such that the operation of the machine is optimized during different stages of a task.

It will be apparent to those skilled in the art that various modifications and variations can be made to the drive system of the present disclosure. Other embodiments of the performance monitor will be apparent to those skilled in the art from consideration of the specification and practice of the drive system disclosed herein. It is intended that the specification and examples be considered as exemplary only, with a true scope of the invention being indicated by the following claims and their equivalents.

What is claimed is:

1. A machine having a ground-engaging work tool, comprising:
   one or more traction devices configured to move the machine on a ground surface;
   a control system including one or more processors, the control system configured to determine a slip experienced by the machine as the machine moves on the ground surface, wherein the slip is determined based on a difference between a machine speed and a ground speed of the machine, wherein the machine speed is an expected speed of the machine based on a speed of at least one traction device of the one or more traction devices and the ground speed is a speed at which the machine is moving on the ground surface;
   a display controlled by the control system to pictorially display (a) the determined slip, (b) a first target range of slip associated with a first operation, and (c) a second target range of slip associated with a second operation while the first target range is being displayed, wherein an efficiency of the machine when the determined slip has a value within the first target range is higher compared to the efficiency when the value of the determined slip is outside the first target range while performing the first operation.

2. The machine of claim 1, wherein each of the first target range of slip and the second target range of slip are displayed as bars which extend from one value of slip to another value of slip.

3. The machine of claim 1, wherein the display of the determined slip is a real-time display of the slip experienced by the machine as the machine moves on the ground surface.

4. The machine of claim 1, wherein the display is further configured to display an overall range of slip, the first target range of slip and the second target range of slip being subsets of the overall range.

5. The machine of claim 1, wherein when the determined slip has a value within the second target range, the efficiency of the machine is higher compared to the efficiency when the value of the determined slip is outside the second target range while performing the second operation.

6. The machine of claim 5, wherein the first target range is displayed in a different color or a different pattern than the second target range.

7. The machine of claim 5, wherein the first target range and the second target range are distinguished from each other.

8. The machine of claim 1, wherein the control system is configured to determine the slip experienced by the machine as ((the machine speed−the ground speed)/the machine speed)*100.

9. The machine of claim 1, further including an interface device configured to move a position of the work tool, the interface device including one or more of an accelerator pedal, a brake pedal, or a joystick, wherein moving the work tool using the interface device changes a location of a marker displayed as the determined slip.

10. The machine of claim 1, wherein the machine is a track-type excavation machine.

11. A method of operating a machine having a ground-engaging work tool and one or more traction devices configured to move the machine on a ground surface, comprising:
    determining, using a control system including one or more processors, a slip experienced by the machine as the machine moves on the ground surface, wherein the slip is determined based on a difference between a machine speed and a ground speed of the machine, wherein the machine speed is an expected speed of the machine based on a speed of at least one traction device of the one or more traction devices and the ground speed is a speed at which the machine is moving on the ground surface; and
    displaying pictorially, on a display of the machine, (a) the determined slip, (b) a first target range of slip associated with a first operation, and (c) a second target range of slip associated with a second operation while the first target range of slip is being displayed, wherein an efficiency of the machine when the determined slip has a value within the first target range is higher compared to the efficiency when the value of the determined slip is outside the first target range while performing the first operation.

12. The method of claim 11, wherein displaying the determined slip includes displaying the determined slip in a real-time manner.

13. The method of claim 11, wherein displaying the first target range and the second target range includes displaying each of the first target range and the second target range as bars that extend from one value of slip to another value of slip.

14. The method of claim 11, further including displaying an overall range of slip along with the determined slip and the first target range and the second target range, wherein the first target range and the second target range are subsets of the overall range.

15. The method of claim 11, wherein when the determined slip has a value within the second target range, the efficiency of the machine is higher compared to the efficiency when the value of the determined slip is outside the second target range while performing the second operation.

16. The method of claim 15, wherein the first target range is displayed in a different color or a different pattern than the second target range.

17. The method of claim 11, further including, receiving at the control system, a signal indicative of the rotational speed from a first sensor and a signal indicative of the ground speed from a second sensor, and wherein determining the slip experienced by the machine includes calculating the slip as ((the machine speed−the ground speed)/the machine speed)*100.

18. A machine having a ground-engaging work tool, comprising:
one or more traction devices configured to move the machine on a ground surface;
a first sensor configured to detect a signal indicative of a speed of a traction device of the one or more traction devices;
a second sensor configured to detect a signal indicative of a speed of the machine on the ground surface;
a control system including one or more processors, the control system in communication with the first and second sensors, the control system being configured to determine a slip experienced by the traction device as the machine moves on the ground surface based on the signals from the first and second sensors; and
a display in communication with the control system such that the control system controls the display to simultaneously display (a) the determined slip, (b) a first target range of slip associated with a first operation, and (c) a second target range of slip different from the first target range and associated with a second operation, wherein
during the first operation of the machine, when the determined slip has a value within the first target range, an efficiency of the machine is higher compared to the efficiency when the value of the determined slip is outside the first target range, and
during the second operation of the machine, which is different from the first operation, when the determined slip has a value within the second target range, the efficiency of the machine is higher compared to the efficiency when the value of the determined slip is outside the second target range.

19. The machine of claim 18, wherein (i) the first target range is displayed in a different color or a different pattern than the second target range, and (ii) the determined slip is displayed in a real-time manner.

20. The machine of claim 18, wherein the control system is configured to determine the slip experienced by the machine as ((machine speed−ground speed)/machine speed)*100, wherein the machine speed is an expected speed of the machine based on the speed of the traction device and the ground speed is the speed of the machine on the ground surface.

* * * * *